United States Patent
Taglialatela et al.

(10) Patent No.: US 7,454,954 B2
(45) Date of Patent: Nov. 25, 2008

(54) KNOCKING PRESENCE EVALUATION CIRCUIT FOR AN INTERNAL COMBUSTION ENGINE, KNOCKING IDENTIFICATION AND CONTROL SYSTEM AND CORRESPONDING PRESSURE SIGNAL PROCESSING METHOD

(75) Inventors: Ferdinando Taglialatela, Giugliano (IT); Giovanni Moselli, Grumo Nevano (IT); Mario Lavorgna, Bacoli (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 287 days.

(21) Appl. No.: 11/361,664

(22) Filed: Feb. 24, 2006

(65) Prior Publication Data

US 2007/0199367 A1    Aug. 30, 2007

(30) Foreign Application Priority Data

Feb. 25, 2005   (EP)   ................................. 05425105

(51) Int. Cl.
*G01L 23/22*   (2006.01)
(52) U.S. Cl. ..................................................... 73/35.06
(58) Field of Classification Search ................ None
See application file for complete search history.

(56) References Cited

U.S. PATENT DOCUMENTS

| | | | | | |
|---|---|---|---|---|---|
| 4,163,385 | A | * | 8/1979 | Kato et al. ................. | 73/35.03 |
| 4,343,278 | A | | 8/1982 | Asano ........................ | 123/425 |
| 4,409,937 | A | | 10/1983 | Asano ........................ | 423/425 |
| 5,935,189 | A | * | 8/1999 | Park ........................... | 701/111 |
| 6,360,586 | B1 | | 3/2002 | Morishita et al. .......... | 73/35.08 |
| 6,561,163 | B1 | | 5/2003 | Takahashi et al. ...... | 123/406.21 |
| 6,810,320 | B2 | * | 10/2004 | Yamamoto et al. .......... | 701/111 |
| 2006/0090544 | A1 | * | 5/2006 | Yorita et al. ................ | 73/35.12 |

FOREIGN PATENT DOCUMENTS

EP            0 639 711 A2    2/1995

OTHER PUBLICATIONS

Millo and Ferraro, "Knock in S.I. Engines: A Comparison Between Different Techniques for Detection and Control," SAE Technical Paper Series 982477, International Fall Fuels and Lubricants Meeting and Exposition, San Francisco, California, Oct. 19-22, 1998.

* cited by examiner

*Primary Examiner*—Robert R Raevis
(74) *Attorney, Agent, or Firm*—Lisa K. Jorgenson; E. Russell Tarleton; Seed IP Law Group PLLC

(57) ABSTRACT

A knocking presence evaluation circuit in an internal combustion engine having a pressure sensor facing a combustion chamber for each cylinder in the engine and suitable to produce a pressure signal, the circuit having an input terminal; a processing block connected by the input terminal to the pressure sensor and receiving the pressure signal, the processing block performing a processing of the pressure signal for isolating oscillations and generating a derived pressure signal; an acquisition block connected to the processing block and receiving the derived pressure signal and generating first and second measure signals, respectively corresponding to a number and a total duration of digital pulses, from the derived pressure signal; and a soft-computing block connected to the acquisition block and receiving the first and second measure signals and outputting a knocking intensity index, calculated by soft-computing techniques, starting from the first and second measure signals.

37 Claims, 10 Drawing Sheets

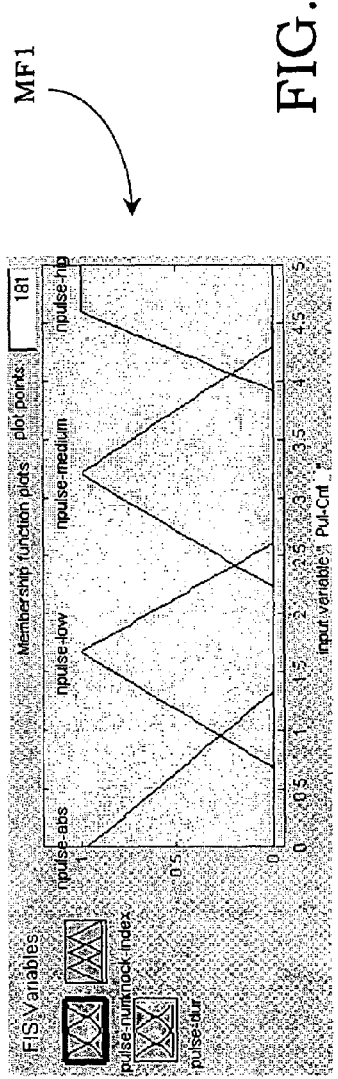
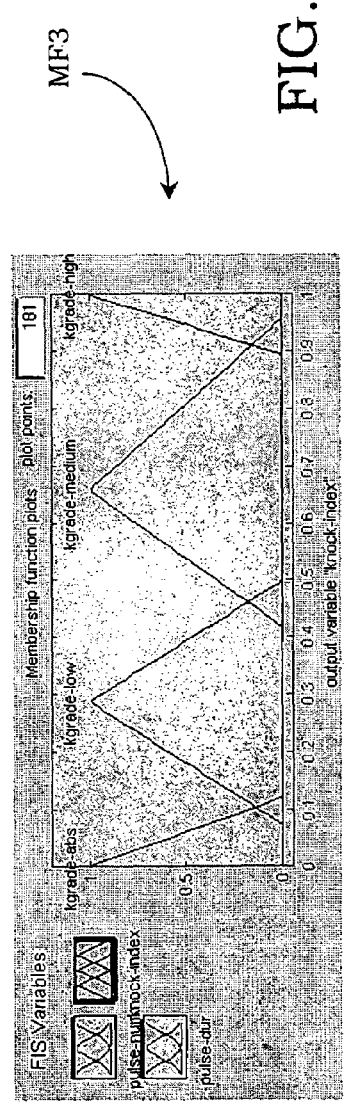
FIG. 7A
FIG. 7B
FIG. 7C

KNOCKING PRESENCE EVALUATION CIRCUIT FOR AN INTERNAL COMBUSTION ENGINE, KNOCKING IDENTIFICATION AND CONTROL SYSTEM AND CORRESPONDING PRESSURE SIGNAL PROCESSING METHOD

BACKGROUND OF THE INVENTION

1. Field of the Invention

The present invention relates to a knocking presence evaluation circuit in an internal combustion engine.

More specifically the invention relates to a knocking presence evaluation circuit in an internal combustion engine having at least a pressure sensor facing a combustion chamber for each cylinder comprised in the engine itself and suitable to detect a pressure signal.

The invention also relates to a knocking identification and control system associated with an internal combustion engine.

The invention finally relates to a processing method of a pressure signal for the detection and evaluation of a combustion phenomenon in an internal combustion engine.

2. Description of the Related Art

As it is well known, knocking phenomena are particularly dangerous for internal combustion engines with controlled spark, implying, besides the emission of a characteristic metallic noise (the so called combustion shock), a whole series of consequences which can seriously damage the engine itself.

Knocking phenomena are in fact particularly dangerous for such engines, implying a whole series of consequences which can seriously jeopardize the operation thereof.

In fact, vibrations, engine power losses, increased heating are generally associated with knockings, reaching, under particularly severe conditions, the breakage of the engine mechanical parts.

In particular, the increased thermal charges, together with the mechanical stresses, can lead to the breakage of some components of the engine (such as pistons, piston rings, head gasket, valves, etc.) due to a well known hot fatigue phenomenon.

The identification and the analysis of the knocking phenomena in controlled spark engines thus represents an important factor for the electronic control of these engines.

For implementing a knocking control and identification strategy it is also known to use sensors suitable to monitor the combustion process which occurs inside an internal combustion engine, in order to evaluate the knocking presence and thus provide a control unit of the engine itself with a feedback.

Most engines currently on the market use suitable acoustic or accelerometric sensors (set on the frequency band 3-20 kHz) to detect the knocking presence.

Such sensors are placed in the engine block and they allow to identify the knocking presence in the combustion chamber through the detection of the vibrations induced in the engine block.

Although advantageous under several aspects, this first solution has various drawbacks.

First of all, the sensors carry out an indirect measure of the knocking presence. In such case, the signal received through these sensors can be contaminated by disturbs independent from the knocking presence, such as for example, the natural mechanical vibrations the engine structure is subjected to during the operation thereof at high revolutions, vibrations which however do not depend on the knocking presence.

Moreover, in the case of some types of vibrational sensors such as resonant sensors, it is necessary to provide different sensors according to the type of engine.

To overcome these drawbacks a knocking presence identification method is alternatively known which analyzes a signal received from a pressure sensor facing directly in the engine combustion chamber.

When the engine is subject to knocking, in fact, the pressure cycles in the combustion chamber have typical oscillations with width peaks gradually decreasing in time whose frequency (oscillating between 3 and 20 kHz) depends on the propagation speed of the pressure waves in the cylinder during the knocking phenomenon, as schematically shown in FIG. 1.

A known model to identify the knocking presence starting form the pressure cycle in combustion chamber acquired by a pressure transducer facing directly in such chamber is described for example in the article by F. Millo and C. V. Ferraro entitled: "Knock in S.I. Engines: A Comparison Between Different Techniques for Detection and Control", SAE paper 982477, 1998.

In practice, however, this model and the others currently in use, provide a quite laborious, and in some cases little efficient, analysis of the pressure signal so as to discriminate the detonation presence or absence. In particular, it is known to use a predetermined knocking intensity critical threshold, beyond which the intervention of the engine unit control is started.

BRIEF SUMMARY OF THE INVENTION

One embodiment of this invention provides a method for detecting in a simple and sure manner the knocking presence in an internal combustion engine overcoming the limitations and drawbacks still limiting the prior art methods.

One embodiment of the present invention detects and processes in real time a pressure signal in a combustion engine cylinder, such signal being suitably amplified and filtered by using soft-computing algorithms for drawing some values linked to the knocking and for sending them to a measurer of the knocking degree which outputs a knocking index, used by the engine unit for performing the knocking control of the engine itself.

One embodiment of the invention is a knocking identification and control system of an internal combustion engine having at least a pressure sensor facing a combustion chamber for each cylinder comprised in the engine itself and suitable to output a pressure signal. The evaluation circuit includes:

an input terminal for connection to the pressure sensor;

an output terminal;

a processing block connected to the input terminal and receiving the pressure signal from the pressure sensor via the input terminal, the processing block performing a processing of the pressure signal for insulating oscillations and generating a derived pressure signal;

an acquisition block having an input connected to the processing block and receiving therefrom the derived pressure signal, the acquisition block generating first and second measure signals respectively corresponding to a number and a total duration of digital pulses obtained from the derived pressure signal; and a soft-computing block having an input connected to the acquisition block and receiving therefrom the first and second measure signals and connected to the output terminal, the soft-computing block supplying the output terminal with a knocking intensity index, calculated by soft-computing techniques, starting from the first and second measure signals.

Another embodiment of the invention is a processing method of a pressure signal for the detection and evaluation of a combustion phenomenon in an internal combustion engine.

The characteristics and advantages of the circuit, of the system and of the method according to the invention will be apparent from the following description of an embodiment thereof given by way of indicative and non limiting example with reference to the annexed drawings.

BRIEF DESCRIPTION OF THE SEVERAL VIEWS OF THE DRAWINGS

In these drawings:

FIGS. 7A-7E show, by way of example, the fuzzy set membership functions of some variables of the block of FIG. 6, a fuzzy algorithm with relevant defuzzification and an estimation map of a Knock-Index signal;

DETAILED DESCRIPTION OF THE INVENTION

Figure 1:
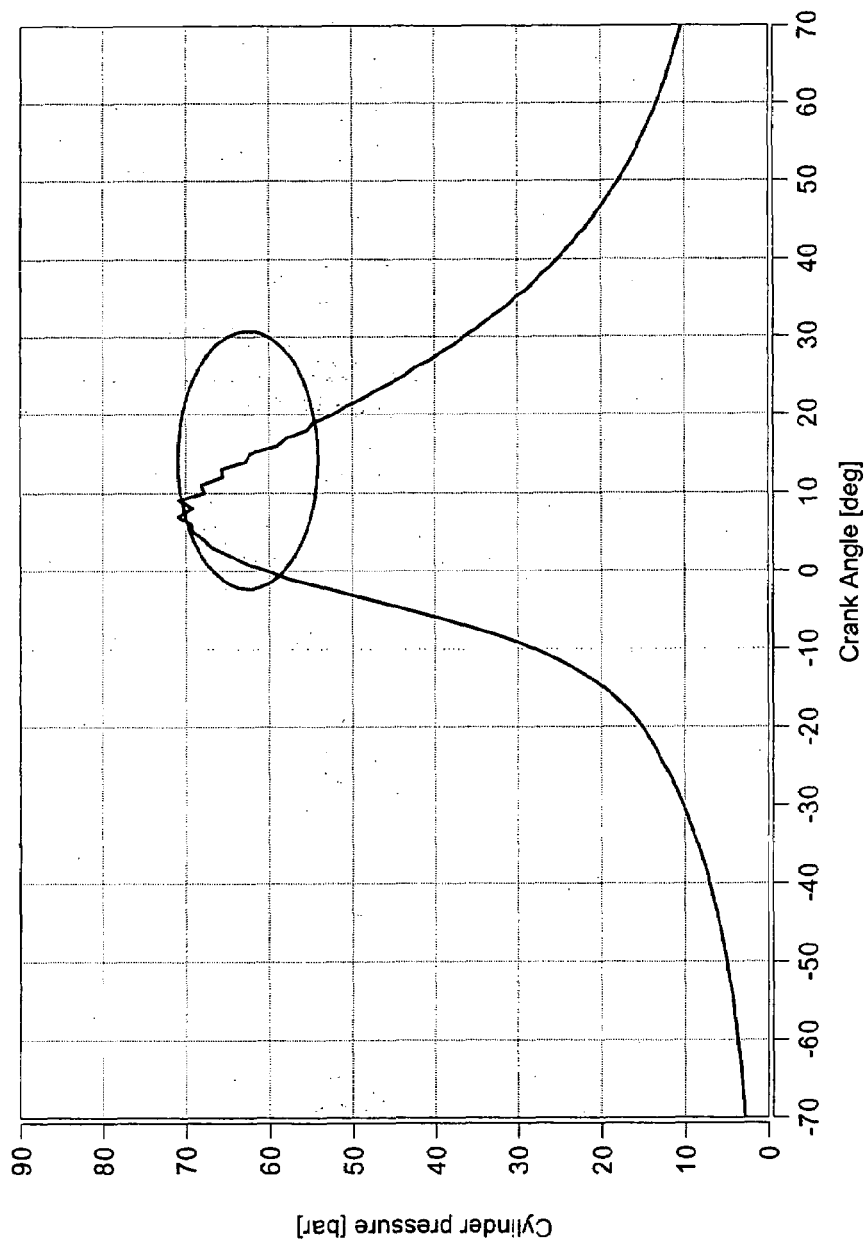
FIG. 1 schematically shows the trend of a pressure signal in an internal combustion engine cylinder in the presence of knocking used by methods realized according to the prior art.
Figure 2:
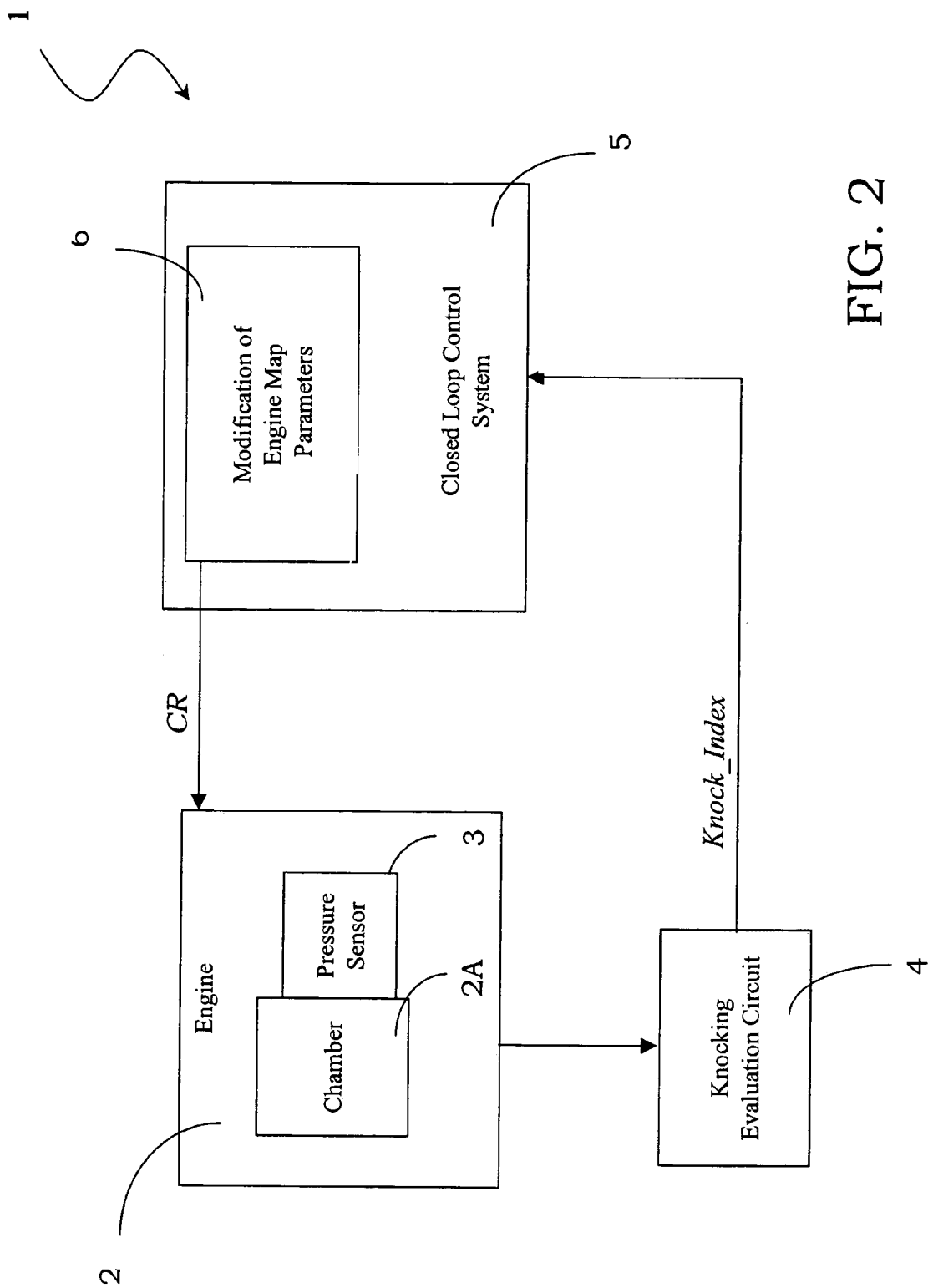
FIG. 2 schematically shows a knocking identification and control system of an internal combustion engine suitable to implement a method according to one embodiment of the invention.

With reference to the figures, and in particular to FIG. 2, 1 globally and schematically indicates a knocking identification and control system of an internal combustion engine 2.

In particular, the control system 1 comprises a knocking presence evaluation circuit 4, being input a pressure signal Pr_Sign, obtained by a suitable pressure sensor 3 facing in a combustion chamber 2A for each cylinder comprised in the internal combustion engine 2.

Hereafter in the description a sole pressure sensor will be referred to considering the exemplary case of a sole knocking cylinder, everything written and considered being subject to be extended in a similar way to other cylinders comprised in the internal combustion engine 2.

The knocking presence evaluation circuit 4 provides a closed loop control system 5 with a Knock_Index signal, in particular a knocking intensity index whose meaning will be more apparent hereafter in the description, the system comprising in turn a parameter control modification block 6 of the internal combustion engine 2, such parameter control modification block 6 providing the internal combustion engine 2 with a control signal CR.

In substance, in the knocking identification and control system 1, the knocking presence evaluation circuit 4 performs the processing of the pressure signal Pr_Sign for drawing therefrom useful parameters for the knocking evaluation. Moreover, the knocking presence evaluation circuit 4 takes care of processing the so measured parameters with soft-computing techniques in order to allot a knocking intensity index Knock_Index to each knocking phenomenon.

On the basis of this knocking intensity index Knock_Index the control parameter modification block 6 controls the control actions which substantially go towards a correction of the parameters allotted in the control maps of the internal combustion engine 2.

Advantageously, the knocking presence evaluation circuit 4 implements the method for processing a pressure signal that reflects the pressure in the combustion chamber and for controlling an internal combustion engine, which, as it will be hereafter clarified, processes the pressure signal Pr_Sign detected by the pressure sensor 3 by using soft-computing techniques for correlating each knocking detection with a determined knocking intensity index Knock_index, comprised between 0 and 1, to be supplied to the closed loop control system 5 for the adjustment of the internal combustion engine 2.

Such method starts from the consideration that a knocking phenomenon, generically indicated as knocking, shows itself with the presence in the pressure cycle of typical fluctuations at high frequency, whose width decreases in time.

In the case of a weak knocking, the width of such pressure oscillations is small, whereas in the case of a strong knocking such oscillations have a greater width.

Advantageously, the method for processing the pressure signal Pr_Sign for the detection and evaluation of a combustion phenomenon in the internal combustion engine 2 comprises the steps of:

receiving a pressure signal Pr_Sign from the pressure sensor 3, in the considered case facing in the combustion chamber for each cylinder of the internal combustion engine 2;

isolating the oscillations of such pressure signal Pr_Sign cycle, obtaining a derived pressure signal Fl_Pr_Sign; and obtaining, from such derived pressure signal, digital pulses corresponding to a knocking phenomenon.

In particular, such derived pressure signal Fl_Pr_Sign is obtained by amplifying and filtering the pressure signal Pr_Sign, so as to eliminate the oscillations at high frequency and isolate the oscillations in a given typical frequency range of a knocking phenomenon, eliminating in such way the influence of the engine operation oscillations, but not linked to such phenomenon.

Moreover, the method provides a measuring step of the number of digital pulses obtained from the derived pressure signal Fl_Pr_Sign and of the total duration of such digital pulses.

Advantageously, the method also comprises an enable step of said measuring step, by means of a resetting signal, in particular supplied by a sensor of the cam shaft connected to the internal combustion engine 2.

The method thus comprises a processing step by means of soft-computing techniques of the measuring values in the measuring step for generating a knocking intensity index Knock_index to be used as control signal of the internal combustion engine 2.

By way of example, such processing step by means of soft-computing techniques provides the use of the fuzzy logic.

Advantageously, the method also provides a control step for the internal combustion engine 2.

This control step uses the knocking intensity index Knock_index generated in the processing step for changing the internal combustion engine 2 parameters.

In particular, such control step comprises the generation of control actions further to the knocking detection for eliminating the presence of these phenomena.

The control actions act on a reduction of the spark advance with respect to a value mapped according to the value of the knocking intensity index Knock_Index.

Such control actions are performed until the knocking phenomenon fades away, i.e. in correspondence with a null value of the knocking intensity index Knock_Index generated by the processing step.

Advantageously, this control step acts in real time on the operation of the internal combustion engine 2.

The knocking presence evaluation circuit 4 suitable to implement such method is shown in greater detail in FIG. 2.

In particular, the knocking presence evaluation circuit 4 has an input terminal IN4 connected to the pressure sensor 3 of the internal pressure sensor 2 and receiving from it a pressure signal Pr_Sign.

Figure 3:
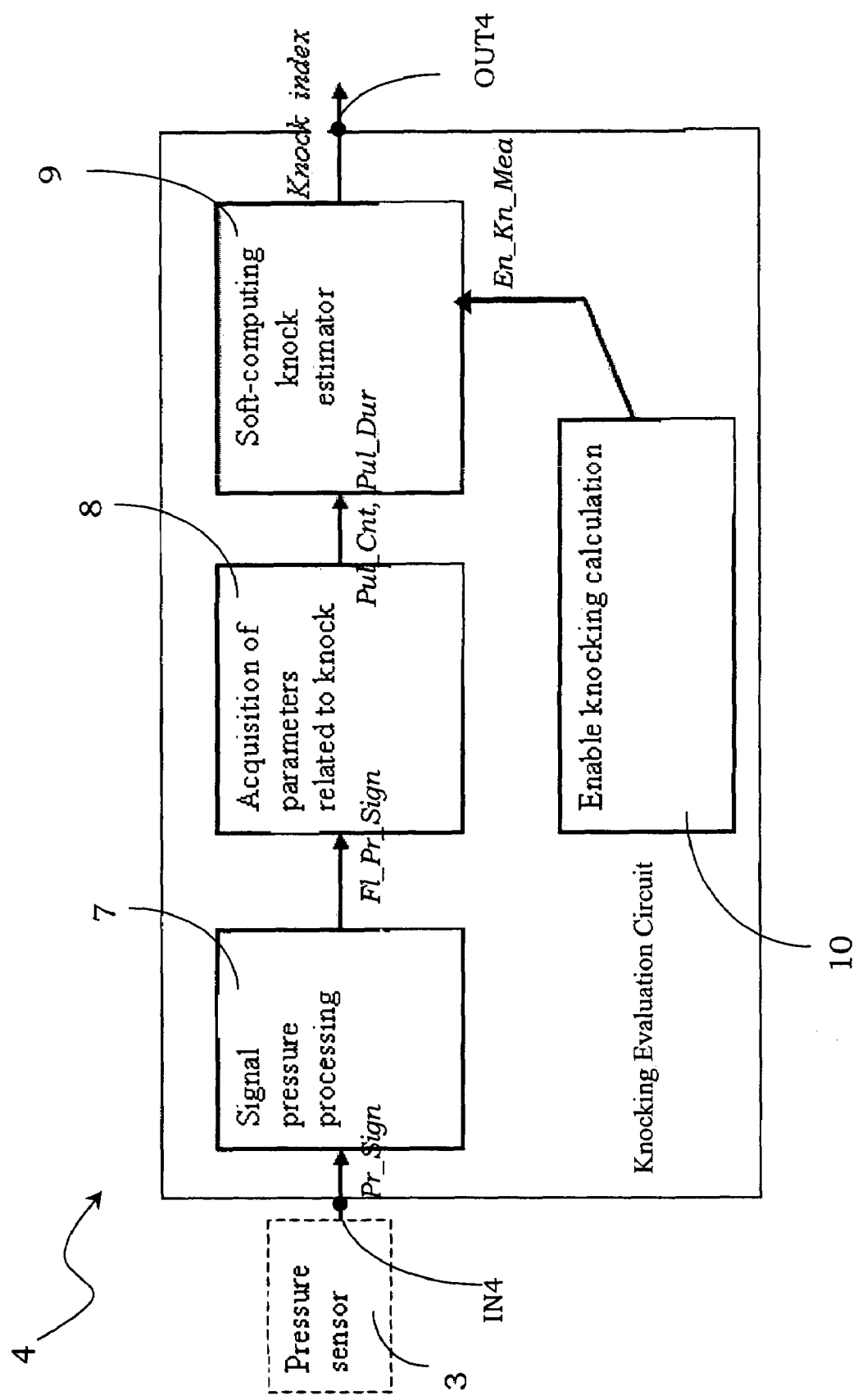
FIG. 3 shows in greater detail a knocking presence evaluation circuit of the system of FIG. 2.

Advantageously, the knocking presence evaluation circuit 4 comprises:

- a processing block 7, suitable to perform a pressure signal Pr_Sign processing, isolating the oscillations, and to generate the derived pressure signal Fl_Pr_Sign;
- an acquisition block 8, suitable to measure the number and the total duration of the digital pulses obtained from the derived pressure signal Fl_Pr_Sign; and
- a soft-computing block 9, suitable to process the measurements performed by the acquisition block 8 and to generate at an output terminal OUT4 of the knocking presence evaluation circuit 4 a knocking intensity index Knock_index, such blocks 7, 8 and 9 being inserted in series with each other between the input terminal IN4 and the output terminal OUT4 of the knocking presence evaluation circuit 4, as schematically shown in FIG. 3.

The knocking presence evaluation circuit 4 also comprises an enable block 10 connected to the soft-computing block 9.

In particular, the processing block 7 receives the pressure signal Pr_Sign, which is an analog signal, and which performs the treatment in order to isolate the oscillations thereof. Advantageously, the block 7 isolates the oscillations at high frequency, typical of a knocking, outputting the derived pressure signal Fl_Pr_Sign.

In substance, the derived pressure signal Fl_Pr_Sign is obtained by suitably adapting and filtering the pressure signal Pr_Sign of the pressure sensor 3.

Such derived pressure signal Fl_Pr_Sign, being input to the acquisition block 8, is processed by this latter so as to draw information relative to the knocking which can be used by the soft-computing block 9 for the calculation of the knocking intensity, in particular for the generation of the knocking intensity index Knock_index.

In particular, the acquisition block 8 outputs a first signal Pul_Cnt corresponding to the number of digital pulses measured for the derived pressure signal Fl_Pr_Sign and a second signal Pul_Dur corresponding to the total duration of such measured digital pulses.

Advantageously, the enable block 10 enables such calculation in correspondence with a suitable engine crank angle, received by a sensor 11 (FIG. 5A) of such crank angle.

Figure 4:
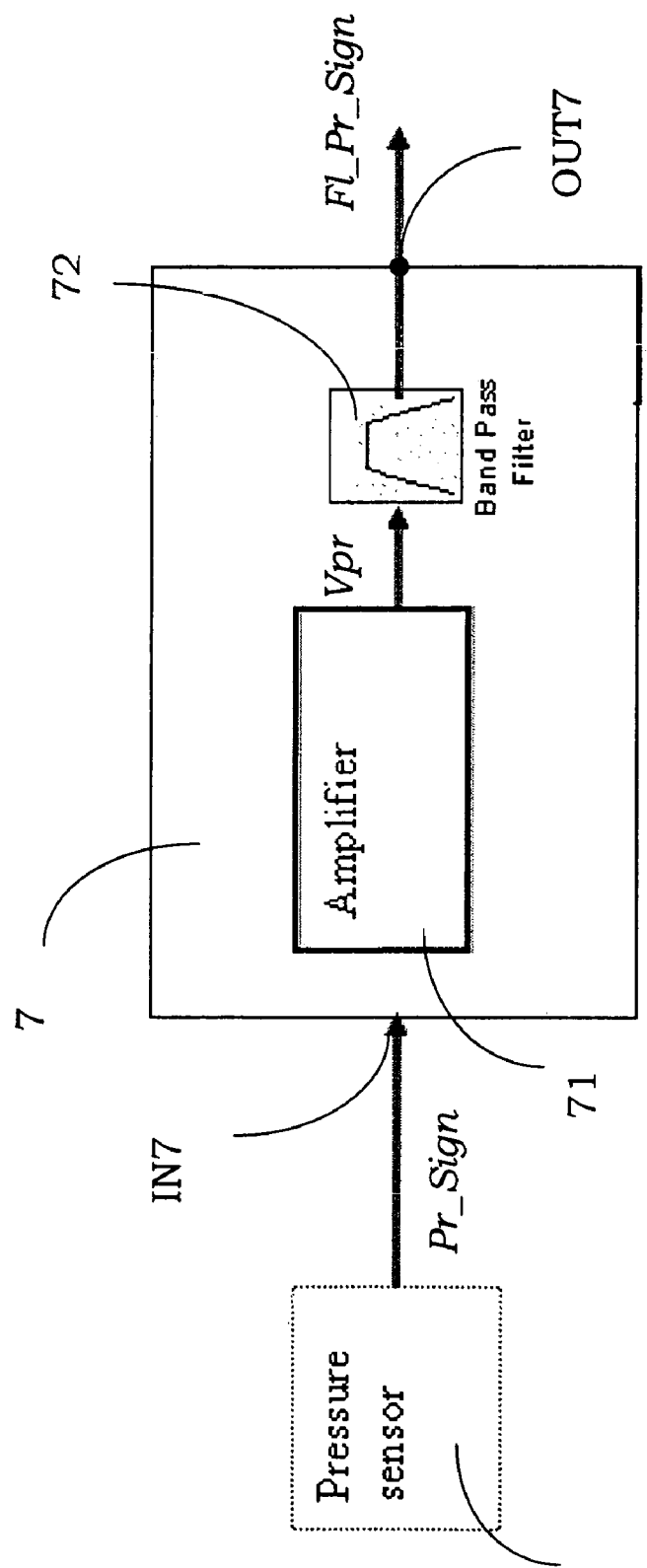
FIG. 4 shows in greater detail an inner block of the circuit of FIG. 3.

In order to highlight the knocking presence, the pressure signal Pr_Sign outputting from the pressure sensor 3 is suitably treated, in particular amplified and filtered by the processing block 7, as shown in greater detail in FIG. 4.

In particular, the processing block 7 essentially comprises a charge amplifier 71 connected at input to an input terminal IN7, in turn connected to the pressure sensor 3 and receiving therefrom the pressure signal Pr_Sign, and connected at output to a filter 72, in turn connected at output to an output terminal OUT7 of the processing block 7, whereat there is the derived pressure signal Fl_Pr_Sign.

In substance, the charge amplifier 71 outputs a voltage signal Vpr, which is made pass through the filter 72, which is a band-pass (for example for the frequency range 3 KHz-20 KHz), in order to separate the high frequency oscillations of the pressure signal, such high frequency oscillations being due, as previously explained, to a knocking presence.

In such way, the processing block 7 allows to separate the high frequency oscillations, useful to evaluate the knocking presence, from those due to the normal combustion, which, as it has been seen, disturb the systems realized according to the prior art.

Figures 5A, 5B:
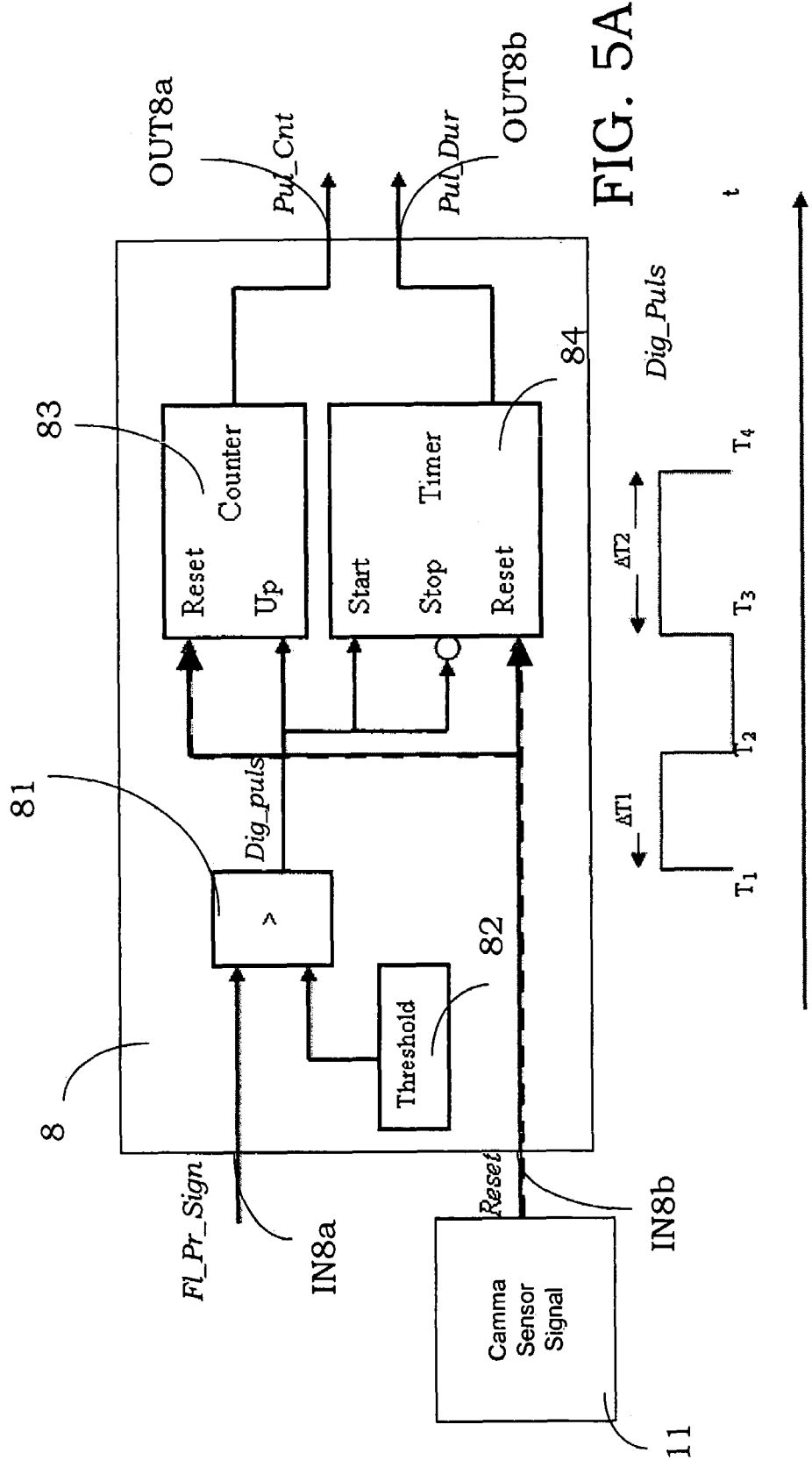
FIG. 5A shows in greater detail a further inner block of the circuit of FIG. 3.
FIG. 5B shows the trend vs. time of an inner signal of the block of FIG. 5A.

The derived pressure signal Pr_Sign, suitably processed by the block 7, is thus sent to a first input terminal IN8a of the acquisition block 8, as shown in greater detail in FIG. 5A.

In particular, the acquisition block 8 comprises a comparator 81 having a first input terminal connected to the first input terminal IN8a of the acquisition block 8 and receiving therefrom the derived pressure signal Fl_Pr_Sign, a second input terminal connected to a threshold reference 82 suitable to supply a threshold value Threshold and an output terminal, whereat there is a signal Dig_Puls.

Such signal Dig_Puls has a step-like trend, i.e. with pulses of different duration, as shown for example in FIG. 5B.

The acquisition block 8 also comprises a counter 83 having an input terminal Up connected to the output terminal of the comparator 81 and receiving therefrom the signal Dig_puls and an output terminal connected to a first output terminal OUT8a of the acquisition block 8, to which it supplies a first measure signal Pul_Cnt, corresponding to the number of the signal pulses Dig_puls, as it will be clarified hereafter.

The acquisition block 8 further comprises a timer 84 having a first input terminal Start and a second negated input terminal Stop, both connected to the output terminal of the comparator 81 and receiving therefrom the signal Dig_puls, as well as an output terminal connected to a second output terminal OUT8b of the acquisition block 8, to which it supplies a second measure signal Pul_Dur, corresponding to the global duration of the signal pulses Dig_puls.

In particular, each time the derived pressure signal Fl_Pr_Sign overcomes the threshold value Threshold, the comparator 81 enhances the value of the signal Dig_puls (rise edge of the signal Dig_puls), which in turn increases the counting value of the counter 83 acting on the input terminal Up. Simultaneously, on rise edge of the signal Dig_puls the timer 84 is triggered acting on the first input terminal Start.

In a similar way, when the derived pressure signal Fl_Pr_Sign decreases again below the threshold value Threshold, the comparator 81 decreases the signal value Dig_puls (fall edge of the signal Dig_puls), blocking the timer 84 by acting on the second input terminal Stop.

In particular, considering as output signal Dig_puls from the comparator 81 the one shown in FIG. 5B it can be verified that, in correspondence with the edges in the instants indicated with T1 and T3, the counter 83 increases the value of Pul_Cnt, and the timer 84 is triggered. In a dual way, in correspondence with the edges in the instants indicated with T2 and T4, the timer 84 is blocked.

It thus occurs that, after the instant T4, the counter 83 outputs a value equal to two, corresponding to the counted pulses (Pul_Cnt=2), and the timer outputs a value equal to $\Delta T1+\Delta T2$ (Pul_Dur=($\Delta T1+\Delta T2$)).

Moreover, the acquisition block 8 receives a reset signal Reset, applied to suitable reset terminals of the counter 83 and of the timer 84, for zeroing the output values (Pul_Cnt and Pul_Dur).

Advantageously, this reset signal Reset is supplied by the sensor 11 of the cam shaft, which signals each engine cycle, which occurs each two revolutions of the crank shaft.

In substance, the acquisition block 8 digitalizes the pressure analog signal as processed by the processing block 7 and it draws parameters useful for determining the knocking presence and degree, in particular by measuring the number Pul_Cnt of digital pulses of the derived pressure signal Fl_Pr_Sign and their total duration Pul_Dur.

Moreover, the threshold value Threshold is suitably mapped and memorized for each condition of the internal combustion engine 2.

Figure 6:
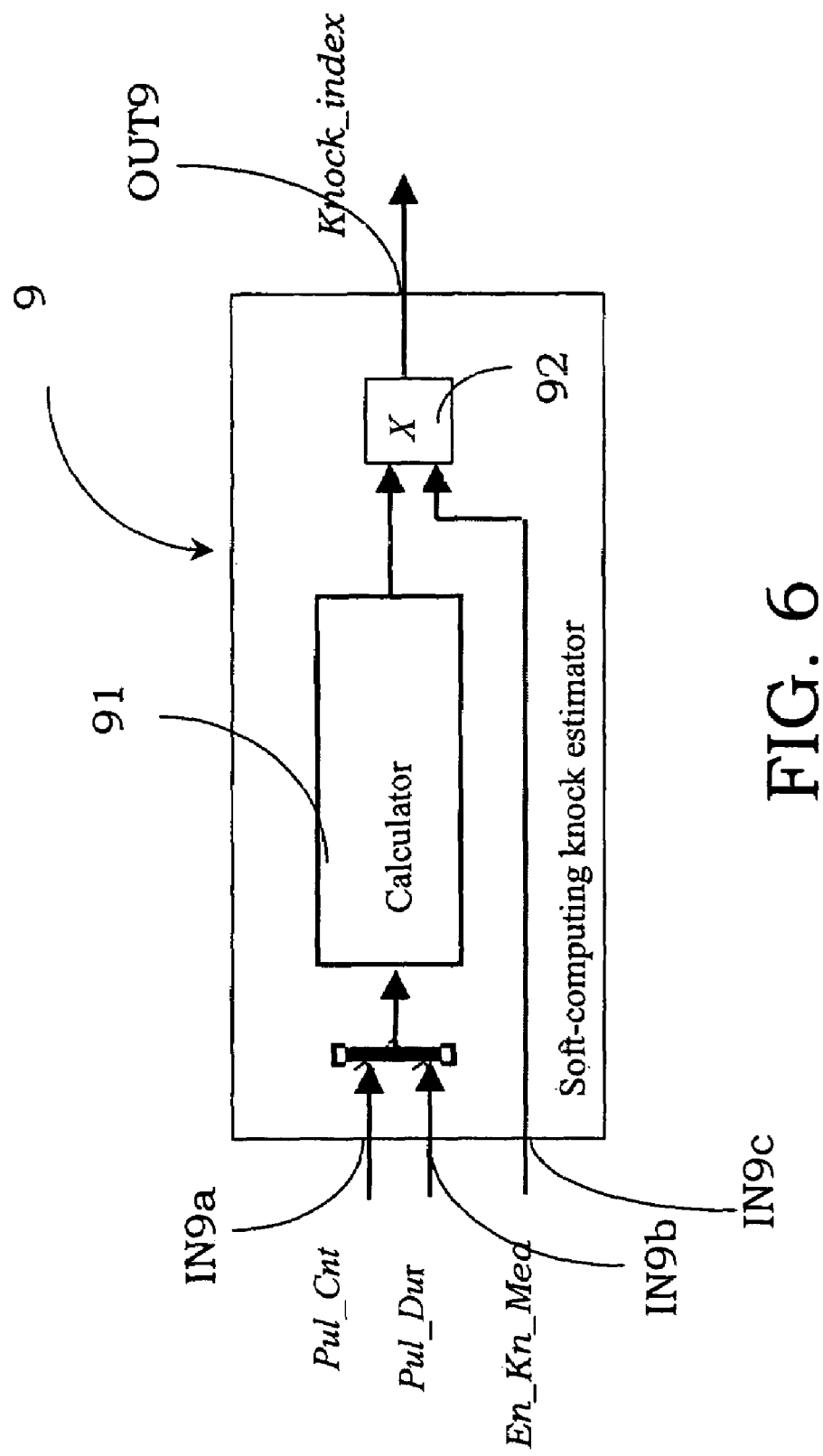
FIG. 6 shows in greater detail a further inner block of the circuit of FIG. 3.

The soft-computing block 9 is shown in greater detail in FIG. 6. In particular, such block 9 has a first input terminal IN9a connected to the first output terminal OUT8a of the acquisition block 8 and receiving therefrom the first measure signal Pul_Cnt, a second input terminal IN9b connected to the second input terminal OUT8b of the acquisition block 8 and receiving therefrom the second measure signal Pul_Dur, an enable terminal IN9c connected to the enable block 10 and receiving therefrom an enable signal En_Kn_Mea, as well as an output terminal OUT9, whereat there is the knocking intensity index Knock_Index.

The soft-computing block 9 comprises a calculation block, indicated with 91, suitable to process the first measure signal Pul_Cnt and the second measure signal Pul_Dur, i.e. the number of digital pulses in the derived pressure signal Fl_Pr_Sign and their total duration, received at input and to supply the knocking intensity index Knock_Index calculated starting from the measure signals.

Advantageously, the soft-computing block 9 comprises a switch block 92, inserted between an output terminal of the calculation block 91 and the output terminal OUT9 of the soft-computing block 9, corresponding to the output terminal OUT4 of the knocking presence evaluation system 4.

In particular, the switch block 92 receives the enable signal En_Kn_Mea to enable the transfer to the output terminal OUT9 of the knocking intensity index Knock_Index.

Advantageously, the enable signal En_Kn_Mea allows such transfer of the knocking intensity index Knock_Index only when the possible knocking phenomenon has extinguished.

It should be noted that the use of soft-computing techniques, implemented by the block 9, is particularly advantageous in case of real time applications, in noisy environments, and it allows the employment of low cost sensors.

As it is well known, the soft-computing techniques are computational methodologies which merge in a synergetic way different aspects of other known technologies, in particular the fuzzy logic, neural networks, genetic algorithms and non-linear distributed systems so as to define and implement hybrid systems.

In particular, it is possible to use neuro-fuzzy-genetic systems, cellular neural networks, and fuzzy cellular networks which, each time, succeed in providing innovative solutions in the various fields of the intelligent control, in the classification, in the modeling and in the simulation of non-linear dynamic systems.

The knocking intensity evaluation is surely suited to a qualitative interpretation especially if it is necessary to characterize the knocking phenomenon independently from the attainment of a knocking critical threshold: herefrom the interpretation of the knocking phenomenon and the evaluation of intensity thereof by using soft-computing techniques.

In this way, the soft-computing block 9 returns at the output a knocking intensity index Knock_Index having a value variable between 0 and 1, which will be used by a feedback control loop, as it will be clarified hereafter in the description.

By way of example, the case wherein the soft-computing block 9 realizes an estimator implemented in fuzzy logic is analyzed.

The following fuzzy sets are thus considered:
for the first measure signal Pul_Cnt (number of pulses)
npulse-abs "pulses number absent",
npulse-low "pulses number low"
npulse-medium "pulses number medium"
npulse-high "pulses number high"
and the relative membership functions, as shown in FIG. 7A and globally indicated with MF1;
for the second measure signal Pul_Dur (total duration of the pulses):
tpulst-abs "pulses total duration absent"
tpulst-low "pulses total duration low"
tpulst-medium "pulses total duration medium"
tpulst-high "pulses total duration high"
and the relative membership functions, as shown in FIG. 7B and globally indicated with MF2.

The fuzzy estimator realized by the soft-computing block 9 thus implements a fuzzy algorithm which uses as antecedent parts the fuzzy sets of the above indicated signals Pul_Cnt and Pul_Dur and as consequent parts the fuzzy sets of the knocking intensity index Knock_Index thus defined:
Kgrade-abs "knocking absent"
Kgrade-low "knocking low"
Kgrade-medium "knocking medium"
Kgrade-high "knocking high"
and the relative membership functions, as shown in FIG. 7C and globally indicated with MF3.

In particular, the fuzzy algorithm of the estimator comprises eight rules whose generic expression is of the type:
IF npulse-X AND tpulst-Y THEN Kgrade-Z
being X, Y, Z={abs, low, medium, high}

Figure 7D:
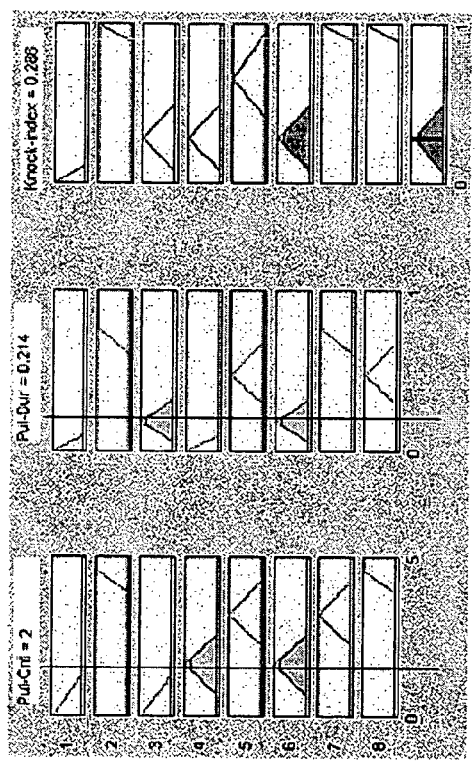

The result of the fuzzy algorithm with corresponding defuzzification is shown in FIG. 7D. For each value of the first measure signal Pul_Cnt and of the second measure signal Pul_Dur, the estimator outputs a value of the knocking intensity index Knock_Index.

Figure 7E:
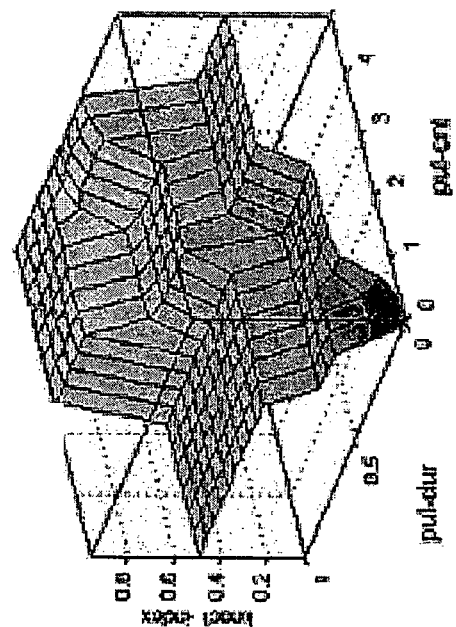

The information obtained by the fuzzy estimator can be summarized also by means of a tridimensional map of the type shown in FIG. 7E.

It should be noted that, for a correct operation of the knocking evaluation system 4, the calculation of the knocking intensity index Knock_Index should occur only after that the knocking phenomenon has reached its completion, i.e. in correspondence with a prefixed engine angle indicated with anglex.

Advantageously, the knocking presence evaluation system 4 thus comprises the enable block 10 suitable to generate an enable signal En_Kn_Mea which respects the above constraint.

Figure 8:
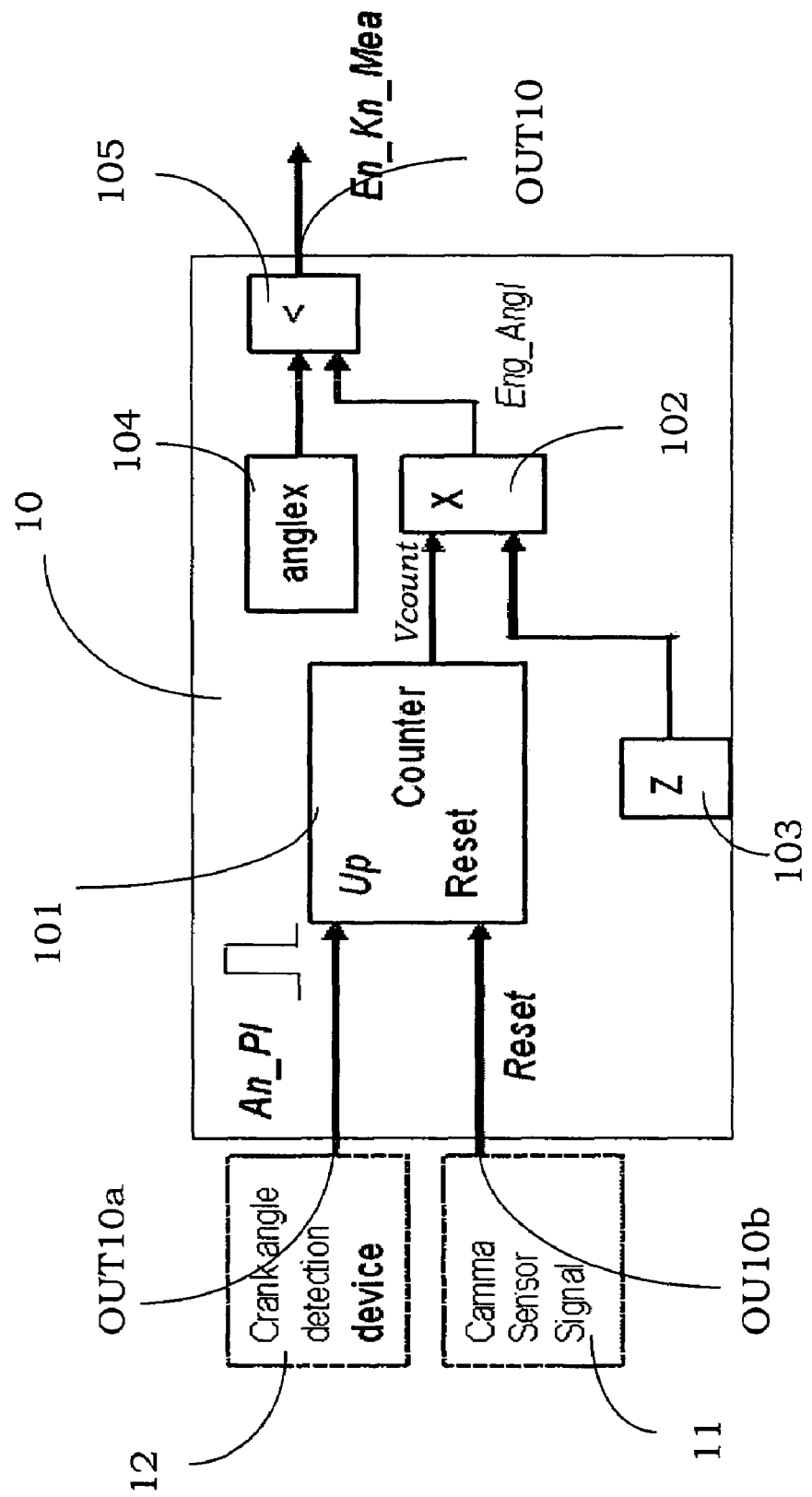
FIG. 8 shows in greater detail a further inner block of the circuit of FIG. 3.

In particular, as shown in FIG. 8, the enable block 10 has a first input terminal IN10a connected to a measure device of the engine angular position, indicated with 12, and receiving therefrom a detection signal An_Pl, in particular a pulse train wherefore it is possible to evaluate the engine angular position, for example the pulses generated in correspondence with each Z crank angles by the measure device 12 of the engine angular position, such as the phonic wheel.

The enable block 10 also has a second input terminal IN10b connected to the sensor 11 of the cam shaft and receiving therefrom the reset signal Reset.

The enable block 10 finally has an output terminal whereon the enable signal En_Kn_Mea is generated which enables the measure of the knocking intensity index Knock_Index.

In particular, the enable block 10 comprises a counter 101 having an input terminal Up connected to the measure device 12 of the engine angular position and receiving therefrom the detection signal An_Pl, as well as an enable terminal connected to the sensor 11 of the cam shaft and receiving therefrom the reset signal Reset.

The counter 101 finally comprises an output terminal whereon a counting value Vcount which, suitably multiplied in a multiplier node 102 by the value Z corresponding to the crank angles used by the measure device 12 of the engine angular position to generate the train of pulses of the detection signal An_Pl, supplies a signal corresponding to the engine angular position, indicated with Eng_Angl.

Substantially, such value Z, supplied to the multiplier node 102 by a reference block 103 is nothing but the engine angle value corresponding to two 5 consecutive pulses of the detection signal An_Pl.

This engine angular position Eng_Angl is compared, in a comparator 105 with the reference engine angle anglex of a reference block 104 and, in the case wherein it is greater than such engine angle anglex (i.e. when the possible knocking phenomenon has extinguished), the enable signal En_Kn_Mea goes to a high logic value (En_Kn_Mea=1) and it enables the supply at output of the knocking intensity index Knock_Index.

In this way, the enable signal En_Kn_Mea allows the transfer of the knocking intensity index Knock_index on the output terminal OUT4 of the knocking presence evaluation circuit 4 only when the possible knocking phenomenon has extinguished.

Advantageously, by using the reset signal Reset, the counter 101 is zeroed at each engine cycle, i.e. each two revolutions of the driving shaft in correspondence with a high logic value of the signal coming from the sensor 11 of the cam shaft.

Figure 9:
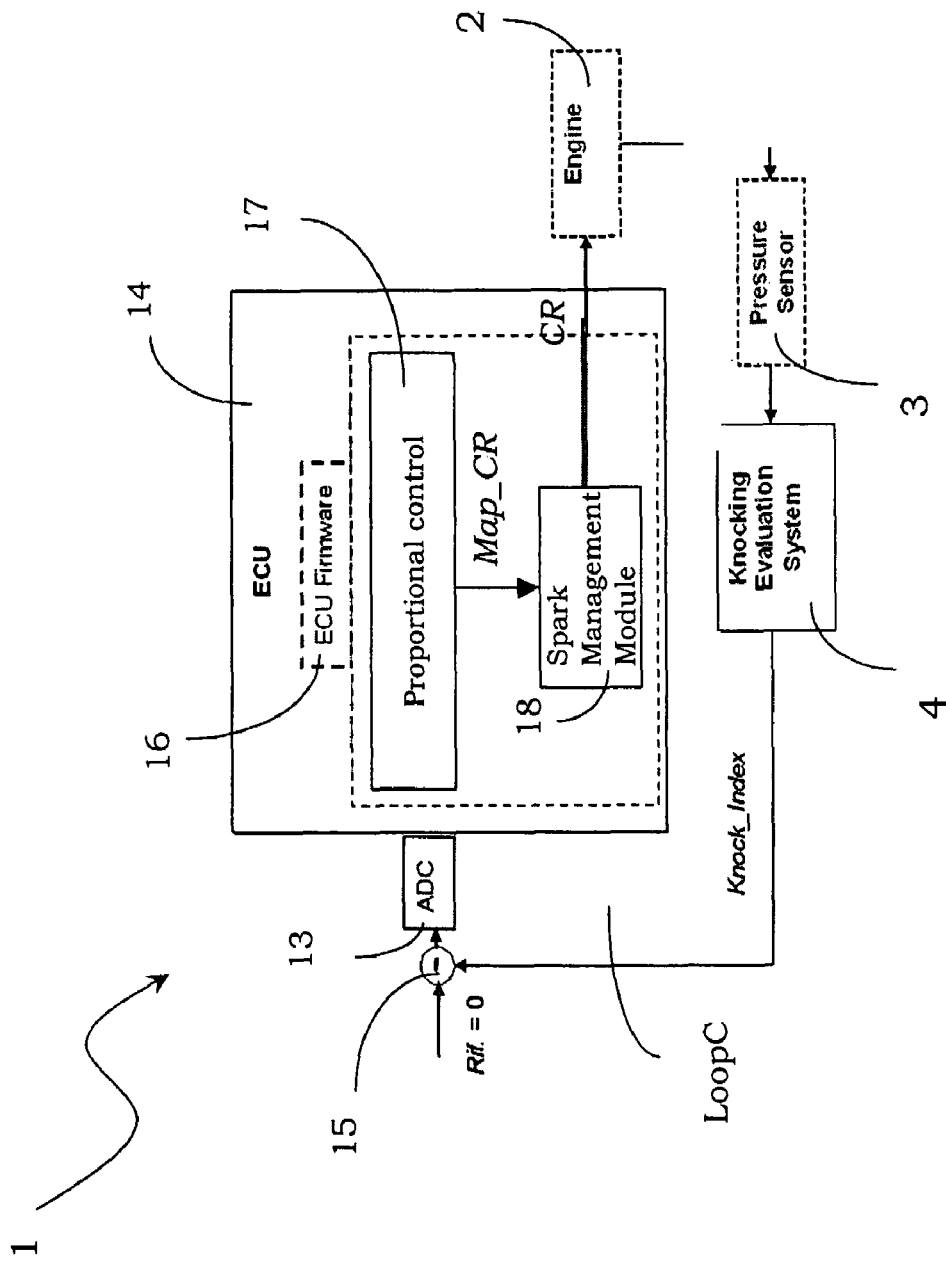
FIG. 9 shows in greater detail the system of FIG. 2.

The knocking intensity index Knock_Index calculated by the knocking presence evaluation circuit 4 is used to perform the control of the internal combustion engine 2, as schematically shown in FIG. 9.

In particular, this Figure shows the knocking identification and control system 1 which comprises a control loop LoopC of the internal combustion engine 2.

In particular, the control loop LoopC comprises the pressure sensor 3 connected to the internal combustion engine 2 and to the knocking presence evaluation circuit 4, in turn connected, by means of a converter ADC 13, to an electronic control unit 14 of the internal combustion engine 2 itself, the control unit being provided with a control firmware 16.

The identification and control system 1 also comprises a subtractor node 15, inserted between the knocking presence evaluation circuit 4 and the converter ADC (Analog to Digital Converter) 13 and receiving a reference signal Rif.

In particular, once the knocking presence has been detected through the analysis of the pressure cycle and once the knocking intensity has been determined through the knocking presence evaluation circuit 4, the control unit 14 must take suitable control actions to eliminate the presence of such phenomena.

The knocking control actions act on a reduction of the spark advance with respect to a mapped value.

This is realized by supplying the firmware 16 of the control unit 14, through the converter ADC 13, with the knocking intensity index Knock_Index which is used by the firmware 16 itself to implement a correction of the mapped spark advance correction and suitably memorized in the firmware 16, indicated with Map_Stored.

In particular, the firmware 16 of the control unit 14 comprises a control structure 17 which calculates a value of the spark advance Map_CR according to the following rule:

$$\text{Map\_}CR = \text{Map\_Stored} + \text{Adv\_Inj} * \text{Knock\_Index}$$

wherein Adv_Inj is a prefixed spark advance value, also suitably memorized in the firmware 16.

The control structure 17 is in particular a control structure of the closed loop proportional type, the value of the spark advance Map_CR being thus modified in the direction of a spark delay until the knocking phenomenon extinguishes, i.e. until the knocking intensity index value Knock_Index reaches a reference equal to zero.

This value of the spark advance Map_CR is thus sent to a spark management module 18, connected at output to the internal combustion engine 2 to which it supplies the control signal CR.

For better understanding the operation of the knocking identification and control system 1, the case is considered wherein, for a set engine point, a strong knocking phenomenon occurs with Knock_Index=0.9. It is to be also supposed that a value of Adv_Inj=2 has been set. It will then occur that, for facing such strong knocking, the mapped value of the spark advance Map_Stored for that determined engine point is delayed at each cycle of an amount equal to Knock_Index*2, with starting value equal to 0.9*2.

The delay is applied until a complete knocking absence is obtained with Knock_Index=0, and:

$$\text{Map\_}CR = \text{Map\_Stored} + \text{Adv\_Inj} * \Sigma_{i=1\ldots n}(\text{knock\_Index})_i,$$

where n is the number of cycles within which the knocking extinguishes.

The value of the spark advance Map_CR calculated by the control structure 17 is sent to the spark management module 18 which progressively updates the control signal CR until the knocking is completely extinguished.

Through simple algorithms which provide at the input the previously calculated knocking intensity index Knock_Index it is thus possible to attend to a correction of the map values relative to the spark advance of the internal combustion engine 2.

It should be underlined how the precision in the knocking entity precision, obtained thanks to the knocking evaluation circuit 4, consequently implies a higher precision and efficiency of the control performed on the internal combustion engine 2.

The knocking identification and control system 1 has been simulated by the Applicant in the Simulink environment.

This simulation has allowed to verify that, by using the knocking identification and control system 1, in correspondence with each knocking phenomenon, an increase of the spark advance value occurs, as desired.

It should be noted that, the knocking identification and control system 1 allows to realize a more efficient and accurate knocking control, making the control unit 14, and in particular the control structure 17 together with the spark management module 18 contained therein, adopt the most suitable anti-knocking actions, in relation with a current knocking level and independently from the attainment of a determined knocking critical threshold, thus overcoming the limits in the systems realized according to the prior art.

Advantageously, this control is obtained by using information coming from an engine pressure signal processed with soft-computing techniques to evaluate the knocking presence and its intensity.

In particular, the knocking identification and control system 1 comprises the knocking presence evaluation circuit 4 suitable to generate a knocking intensity index which, suitably used by the control unit 14, changes the control law of the internal combustion engine.

The use of soft-computing techniques of the pressure signal to evaluate the knocking presence and intensity makes the system extremely innovative, sure and simple to be implemented, allowing a real time knocking control.

In substance, the main innovative characteristics of the proposed system are the following:

use of soft-computing techniques to obtain a knocking intensity evaluation being efficient and simple to be implemented, thus succeeding in allotting a particular knocking intensity to each knocking phenomenon independently from the attainment of a prefixed intensity critical threshold;

use of the pressure signal for drawing therefrom particular values related to the knocking phenomenon, obtaining a direct and more accurate measure of the knocking phenomenon with respect to that obtained by traditional vibrational sensors;

use of a simple hardware structure which allows a real time knocking control, with elimination of the vibrational sensors in favor of low cost pressure sensors with a remarkable economic advantage;

management of the small knocking phenomena too, by suitably adjusting the control actions, avoiding that such phenomena can, in time, damage the engine mechanical parts.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A knocking presence evaluation circuit in an internal combustion engine having at least a pressure sensor facing a combustion chamber for each cylinder comprised in the engine itself and suitable to output a pressure signal, said evaluation circuit comprising:
   an input terminal for connection to the pressure sensor;
   an output terminal;
   a processing block connected to the input terminal and receiving said pressure signal from the pressure sensor via the input terminal, said processing block performing a processing of said pressure signal for isolating oscillations and generating a derived pressure signal;
   an acquisition block having an input connected to said processing block and receiving therefrom said derived pressure signal, said acquisition block generating first and second measure signals respectively corresponding to a number and a total duration of digital pulses obtained from said derived pressure signal; and
   a soft-computing block having an input connected to said acquisition block and receiving therefrom said first and second measure signals and connected to the output terminal, said soft-computing block supplying the output terminal with a knocking intensity index, calculated by soft-computing techniques, staffing from said first and second measure signals.

2. The knocking presence evaluation circuit according to claim 1, wherein said processing block comprises:
   a charge amplifier having an input connected to said pressure sensor; and
   a filter connected having an input connected to the charge amplifier and an output connected to an output terminal of said processing block suitable to supply said derived pressure signal.

3. The knocking presence evaluation circuit according to claim 2 wherein said charge amplifier receives said pressure signal and outputs a voltage signal.

4. The knocking presence evaluation circuit according to claim 3 wherein said filter is a band-pass filter suitable to filter said voltage signal and to eliminate high and low frequency oscillations.

5. The knocking presence evaluation circuit according to claim 1, wherein said acquisition block comprises:
   a threshold reference suitable to supply a threshold value; and
   a comparator having a first input terminal connected to a first input terminal of said acquisition block and receiving therefrom said derived pressure signal generated by said processing block, a second input terminal connected to the threshold reference, and an output terminal at which the comparator provides a counting signal having a plurality of pulses of different duration.

6. The knocking presence evaluation circuit according to claim 5 wherein said acquisition block further comprises a counter having an input terminal connected to said output terminal of said comparator and receiving therefrom said counting signal and an output terminal connected to an output terminal of said acquisition block, to which the counter supplies said first measure signal, corresponding to a number of pulses of said counting signal.

7. The knocking presence evaluation circuit according to claim 5 wherein said acquisition block further comprises a timer having a first input terminal and a negated second input terminal, both connected to said output terminal of said comparator and receiving therefrom said counting signal, as well as an output terminal connected to a first output terminal of said acquisition block, to which the timer supplies said second measure signal, corresponding to a global duration of said pulses of said counting signal.

8. The knocking presence evaluation circuit according to claim 7 wherein said acquisition block further comprises a counter having an input terminal connected to said output terminal of said comparator and receiving therefrom said counting signal and an output terminal connected to a second output terminal of said acquisition block, to which the counter supplies said first measure signal, corresponding to a number of pulses of said counting signal, wherein said counter and said timer have respective reset terminals receiving a reset signal.

9. The knocking presence evaluation circuit according to claim 8 wherein said reset signal is generated by a sensor of the cam shaft of said internal combustion engine in correspondence with each engine cycle.

10. The knocking presence evaluation circuit according to claim 5 wherein said threshold value is mapped and memorized for each operation condition of said internal combustion engine.

11. The knocking presence evaluation circuit according to claim 1, wherein said soft-computing block comprises a calculation block receiving said first and second measure signals (and having an output connected to said output terminal of said knocking presence evaluation circuit whereon the soft-computing block generates said knocking intensity index.

12. The knocking presence evaluation circuit according to claim 11 wherein said soft-computing block further comprises a switch block, inserted between an output terminal of said calculation block and said output terminal of said knocking presence evaluation circuit.

13. The knocking presence evaluation circuit according to claim 12 wherein said switch block receives an enable signal suitable to enable the switch block transfer to said output terminal of said knocking intensity index.

14. The knocking presence evaluation circuit according to claim 12 wherein said calculation block implements a soft-computing technique chosen among fuzzy logic, neural networks, genetic algorithms and non-linear distributed systems so as to define and implement a hybrid system.

15. The knocking presence evaluation circuit according to claim 12 wherein said calculation block realizes an estimator implemented with soft-computing techniques.

16. The knocking presence evaluation circuit according to claim 1, further comprising an enable block connected to said soft-computing block and supplying said soft-computing block with an enable signal.

17. The knocking presence evaluation circuit according to claim 16 wherein said enable block has a first input terminal connected to an angular position measure device of said internal combustion engine and receiving therefrom a detection signal, a second input terminal connected to a sensor of a cam shaft of said internal combustion engine and receiving therefrom a reset signal, as well as an output terminal whereon said enable signal is generated.

18. The knocking presence evaluation circuit according to claim 17, wherein said enable block comprises a counter having an input terminal connected to said angular position measure device and receiving therefrom said detection signal, an enable terminal connected to said sensor of the cam shaft and receiving therefrom said reset signal, as well as an output terminal whereon a counting value is generated.

19. The knocking presence evaluation circuit according to claim 18, wherein said enable block further comprises:
a reference block that supplies a reference value corresponding to a crank angle value used by said angular position measure device; and
a multiplier connected to said counter and suitable to multiply said counting value by the reference value to generate a signal corresponding to an angular position of the engine.

20. The knocking presence evaluation circuit according to claim 19, wherein said enable block further comprises a comparator connected to said multiplier and receiving therefrom said signal corresponding to an angular position of the engine, and to an output terminal of said enable block, said comparator receiving a signal corresponding to an engine angle, said signal corresponding to the engine angle indicating an extinction of knocking in the engine.

21. A knocking identification and control system associated with an internal combustion engine having a pressure sensor suitable to output a pressure signal indicative of pressure in a combustion chamber of the engine, the knocking identification and control system comprising:
a knocking presence evaluation circuit that includes:
an input terminal for connection to the pressure sensor;
an output terminal;
a processing block connected to the input terminal and receiving said pressure signal from the pressure sensor via the input terminal, said processing block performing a processing of said pressure signal for isolating oscillations and generating a derived pressure signal;
an acquisition block having an input connected to said processing block and receiving therefrom said derived pressure signal, said acquisition block generating first and second measure signals respectively corresponding to a number and a total duration of digital pulses obtained from said derived pressure signal; and
a soft-computing block having an input connected to said acquisition block and receiving therefrom said first and second measure signals and connected to the output terminal, said soft-computing block supplying the output terminal with a knocking intensity index, calculated by soft-computing techniques, staffing from said first and second measure signals; and
a control unit connected to the knocking presence evaluation circuit and structured to control the engine.

22. The knocking identification and control system according to claim 21, further comprising:
an analog-digital converter coupled between the knocking presence evaluation circuit and the control unit, which is provided with a control firmware.

23. The knocking identification and control system according to claim 22, further comprising a subtractor node, inserted between said knocking presence evaluation circuit and said analog-digital converter and receiving a reference signal.

24. The knocking identification and control system according to claim 21, wherein said control unit takes control action based on said knocking intensity index to reduce knocking in the engine.

25. The knocking identification and control system according to claim 24, wherein said control unit is structured to reduce knocking by reducing a spark advance value with respect to a mapped value.

26. The knocking identification and control system according to claim 25, wherein said control unit comprises a control structure suitable to calculate said spark advance value according to the following rule:

$$Map\_CR = Map\_Stored + Adv\_Inj * Knock\_Index,$$

wherein:
Map_CR is said spark advance value;
Map_Stored is said mapped value;
Adv_Inj is a prefixed spark advance value memorized in said control unit; and
Knock_Index is said knocking intensity index.

27. The knocking identification and control system according to claim 26, wherein said control structure is a control structure of the closed loop proportional type.

28. The knocking identification and control system according to claim 25, wherein said control unit farther comprises a spark management module having an input connected to said control structure and an output connected to said internal combustion engine to which the spark management module supplies a control signal.

29. A method for processing a pressure signal for detecting and evaluating a combustion phenomenon in an internal combustion engine, the method comprising the steps of:
receiving a pressure signal detected by a pressure sensor associated with said internal combustion engine;
isolating oscillations of said pressure signal, and obtaining a derived pressure signal;
obtaining from said derived pressure signal digital pulses corresponding to a knocking phenomenon; and measuring a number of digital pulses obtained from said derived pressure signal and measuring a total duration of said digital pulses;

wherein said derived pressure signal is obtained by amplifying and filtering said pressure signal, so as to eliminate high frequency oscillations and isolate oscillations in a range of frequencies typical of said knocking phenomenon.

30. The method according to claim 29, further comprising enabling said measuring steps using a reset signal.

31. The method according to claim 30, wherein said reset signal is supplied by a cam shaft sensor of said internal combustion engine.

32. The method according to claim 29, further comprising processing, using soft-computing techniques, values measured in said measure steps to generate a knocking intensity index.

33. The method according to claim 32, further comprising controlling said internal combustion engine using said knocking intensity index generated in said processing step to modify operation parameters of said internal combustion engine.

34. The method according to claim 33, wherein said controlling step comprises eliminating said knocking phenomenon.

35. The method according to claim 34, wherein said controlling step includes reducing a spark advance value with respect to a mapped value according to said knocking intensity index.

36. The method according to claim 35, wherein said reducing step is performed until said knocking phenomenon extinguishes, in correspondence with a void value of said knocking intensity index generated by said processing step.

37. The method according to claim 34, wherein said controlling step acts in real time on the operation of said internal combustion engine.

* * * * *

UNITED STATES PATENT AND TRADEMARK OFFICE
CERTIFICATE OF CORRECTION

PATENT NO. : 7,454,954 B2
APPLICATION NO. : 11/361664
DATED : November 25, 2008
INVENTOR(S) : Ferdinando Taglialatela et al.

It is certified that error appears in the above-identified patent and that said Letters Patent is hereby corrected as shown below:

Column 13
Line 2, "(and having an output connected to said output terminal of" should read as
-- and having an output connected to said output terminal of --

Line 12, "suitable to enable the switch block transfer to said output" should read as
-- suitable to enable a switch block transfer to said output --

Column 14
Lines 10-11, "digital pulses obtained from said derived pressure signal; and" should read as -- digital pulses obtained from said derived pressure signal; --

Lines 17-18, "calculated by soft-computing techniques, staffing from said first and second measure signals; and" should read as -- calculated by soft-computing techniques, starting from said first and second measure signals; and --

Signed and Sealed this

Tenth Day of March, 2009

JOHN DOLL
*Acting Director of the United States Patent and Trademark Office*